No. 655,347. Patented Aug. 7, 1900.
J. E. LUDWIG.
AXLE LUBRICATOR.
(Application filed Dec. 4, 1899.)
(No Model.)
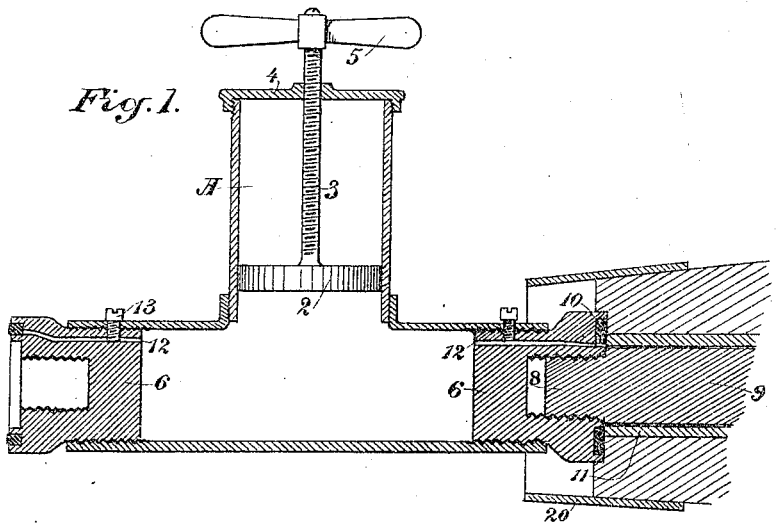
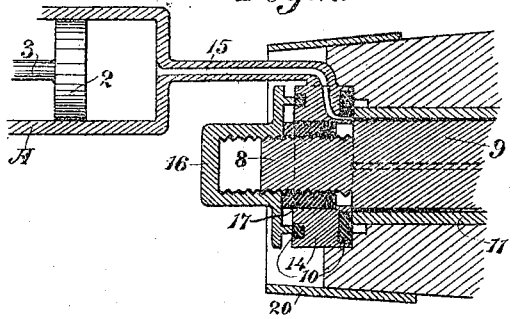
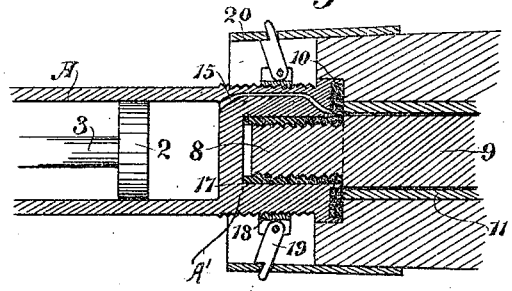
Witnesses,
Inventor,
Jacob E Ludwig
By Dewey Strong & Co
Attys

UNITED STATES PATENT OFFICE.

JACOB E. LUDWIG, OF SAN FRANCISCO, CALIFORNIA.

AXLE-LUBRICATOR.

SPECIFICATION forming part of Letters Patent No. 655,347, dated August 7, 1900.

Application filed December 4, 1899. Serial No. 739,118. (No model.)

*To all whom it may concern:*

Be it known that I, JACOB E. LUDWIG, a citizen of the United States, residing in the city and county of San Francisco, State of California, have invented an Improvement in Axle-Lubricators; and I hereby declare the following to be a full, clear, and exact description of the same.

My invention relates to a device which is designed for the lubrication of vehicle-axles. Its object is to enable the user to apply a lubricant to axles of vehicles of all descriptions without removing the wheels in the usual manner, and this when heavily-loaded vehicles are to be lubricated is of considerable advantage.

It consists of a lubricant-reservoir with means for connecting it with the outer end of the axle to be lubricated and means for forming a tight joint therewith and a device whereby the lubricant may be forced into the space between the axle and the axle-box.

My invention comprises details of construction which will be more fully explained by reference to the accompanying drawings, in which—

Figure 1 is a sectional view showing the application of my apparatus with detachable connecting ends. Fig. 2 is a modification showing a ring for retaining the apparatus in contact with the part to be lubricated. Fig. 3 shows the apparatus when used on heavy wagons.

The lubricant-receptacle A may be of any suitable size and form and provided with a means for ejecting the lubricant from it at will. As here shown, this means consists of a plunger 2, having a screw-threaded stem 3 turnable in a correspondingly-threaded head or cover 4 and having a handle 5, by which it may be turned. The lubricant-containing chamber may have a transverse portion with end plugs 6 removably secured thereto either by screw-threads or other fastening. The centers of the outer ends of these end plugs 6 have screw-threaded sockets which are adapted to fit upon the screw-threaded ends 8 of the axles 9 and by means of washers 10 fitting in countersunk chambers in the ends of these plugs 6 when the nut has been removed from the axle end and the plug 6 screwed into its place. The washer 10, abutting against the end of the axle-box 11, forms a tight joint to prevent escape of the lubricant at that point. Through the plug 6 and in line with the annular space between the axle-box and the axle is a passage 12, controlled by a closing screw or cock 13.

When the axle is to be lubricated by this device, it is only necessary to remove the nut and to screw the head 6 upon the end of the spindle until the washer 10 abuts and makes a tight joint with the axle-box. The screw or cock 13 being opened and the opposite end of the chamber A closed the pressure upon the piston 2 will force the lubricant through the passage 12 and into the annular space around the axle until it is perfectly lubricated. The parts may then be removed and the nut restored to its place upon the end of the axle. By using different sizes of heads 6, all of which fit into the chamber A, but have the holes in their outer ends adapted for different axles and screw-threads, this device can be used upon a great variety of different-sized axles, such as are usually found. Another preferable way is to connect the lubricant containing and forcing cylinder A with a sleeve or collar 14 by means of a pipe 15, having a passage which leads into the collar 14 and through its inner end. Both ends of this collar 14 are chambered to receive washers 10, the one at the inner end abutting against the end of the axle-box, as previously described, and the outer one being pressed against by the annular flange of the nut 16, which is removed from the end 8 of the axle to allow the collar 14 to be inserted, and the nut is afterward screwed on to force the collar to its bearing, as previously stated. Within the collar 14 is an elastic annular washer 17, and when the nut is screwed on over the outside of the end 8 of the axle the annular flange upon the inner end of the nut will compress the elastic washer 17 and cause it to fill the space between the interior of the collar 14 and the threaded portion 8 of the axle, and this serves to prevent a large body of grease or lubricant from collecting around this portion of the axle during the operation. The passage through the conducting-pipe 15 and through the collar 14 opens interior to the washer 10 at the inner end, so that the lubricant forced through this passage will pass into the space between the axle and the axle-box, as previously described.

For some forms of heavy vehicles I have shown, Fig. 3, the lubricant-containing cylinder A as having a threaded extension A' of sufficient size to pass over the screw-threaded end of the axle, and its inner end is fitted, as before described, with a washer 10 to abut against the wheel-hub or a channel therein which surrounds the axle-box. Interior to this extension A' is the elastic washer or gasket 17, previously described, which prevents the lubricant from accumulating in quantity about the threaded outer end of the axle. The passage 15 extends in this case, as before, from the chamber A to the point where it connects with the annular space around the axle. In order to fit the joint in this case, I have shown a ring 18, having internal screw-threads to fit upon corresponding threads on the inner end of the tubular lubricant-container A. Pivoted to this ring 18 are arms 19, which extend radially outward, and they are adapted to engage with the inner face of the projecting hub-band 20, as well shown in Fig. 2, and when thus engaged these radial arms 19 stand bracing outwardly. When the tube A is screwed in through the ring 18, these braces 19 hold the ring in place, and the inner end of A will thus be caused to advance through the ring until tight joints are made by the annular washers 10 and 17.

It will be manifest that modifications may be made in the connecting devices, the object being in any case to enable the lubricant to be forcibly injected around the axle and at the same time to prevent leakage at the connecting-joints.

Having thus described my invention, what I claim as new, and desire to secure by Letters Patent, is—

1. An axle-lubricating device comprising a removable, readily-attachable, lubricant-containing cylinder having a piston and means whereby said piston is operated, means carried by the cylinder and forming an end socket adapted to inclose the end of the axle after the securing-nut is removed, said cylinder having a passage connecting its interior with the space surrounding the axle, and means whereby a tight joint is formed between the socket end of the cylinder and the parts to be lubricated.

2. The combination with a lubricant-container and means for forcing the lubricant therefrom, means carried by the container and having sockets to be alined with and adapted to receive the threaded end of the axle when the securing-nut is removed, said means provided with a passage connecting the interior of the container with the parts to be lubricated, and washers adapted to be compressed by an endwise movement of the container to form a tight joint substantially at the place where the lubricant is applied.

3. An axle-lubricating device consisting of a lubricant-containing cylinder, a plunger and means by which it is advanced, said cylinder having means connecting its interior with the space between the axle and its box, a washer forming a tight joint between the connecting end and the wheel-hub, and a compressible sleeve surrounding the screw-threaded end of the axle, said sleeve being thickened and expanded by compression to make a joint around the screw-threads and prevent accumulations of lubricant.

4. An axle-lubricating device consisting of a lubricant-containing cylinder, a plunger or piston movable therein, means connecting the inner end of the cylinder with the axle-hub consisting of a screw-threaded ring through which the corresponding threads upon the cylinder may be advanced, radially-disposed bracing-arms projecting outwardly from the ring and engaging the inner periphery of the projecting hub-band, washers forming joints respectively between the inner end of the cylinder and the hub and around the screw-threaded end of the axle to prevent the leakage of lubricant at these points, and a passage from the lubricant pressure-chamber to a space between the axle and its box.

In witness whereof I have hereunto set my hand.

JACOB E. LUDWIG.

Witnesses:
S. H. NOURSE,
JESSIE C. BRODIE.